United States Patent [19]

Inata et al.

[11] 4,196,066

[45] Apr. 1, 1980

[54] CURED AROMATIC POLYESTER COMPOSITION AND PROCESS FOR ITS PRODUCTION

[75] Inventors: Hiroo Inata; Makoto Ogasawara; Tsuto Morinaga; Akihiro Norike, all of Hino, Japan

[73] Assignee: Teijin Limited, Osaka, Japan

[21] Appl. No.: 920,834

[22] Filed: Jun. 30, 1978

[30] Foreign Application Priority Data

Jul. 5, 1977 [JP] Japan .................................. 52/79445
Apr. 10, 1978 [JP] Japan .................................. 53/41326
Apr. 12, 1978 [JP] Japan .................................. 53/42062

[51] Int. Cl.² ........................ C08F 8/00; C08G 18/00
[52] U.S. Cl. ......................... 204/159.15; 204/159.19; 264/171; 264/211; 264/236; 264/347; 528/96; 528/99; 528/101; 528/112; 528/289; 528/297
[58] Field of Search ................. 260/835, 873; 528/96, 528/289, 99, 101, 112, 297; 204/159.19, 159.15; 264/236, 347, 211, 22, 171

[56] References Cited

U.S. PATENT DOCUMENTS

| | | | |
|---|---|---|---|
| 3,729,446 | 4/1973 | Holub et al. ..................... 260/476 Z |
| 3,742,089 | 6/1973 | Schroeter ............................... 260/873 |
| 3,867,478 | 2/1975 | Chimura et al. ............. 260/857 PG |
| 3,953,405 | 4/1976 | Feinauer et al. .................... 260/75 T |
| 3,960,686 | 6/1976 | Magosch et al. ................ 204/159.19 |
| 4,029,631 | 6/1977 | Bollen et al. ...................... 260/40 R |
| 4,110,187 | 8/1978 | Sloan et al. ...................... 204/159.19 |
| 4,113,594 | 9/1978 | Nyberg ............................. 204/159.15 |

*Primary Examiner*—Richard B. Turer
*Attorney, Agent, or Firm*—Sherman & Shalloway

[57] ABSTRACT

A cured or uncured linear aromatic polyester composition melt-blended and composed of (A) 100 parts by weight of a saturated linear aromatic polyester in which at least 70 mole % of the acid component consists of an aromatic dicarboxylic acid, and (B) 0.1 to 50 parts by weight of a reactive compound which is solid at room temperature or is a liquid having a boiling point of at least 200° C. under atmospheric pressure, and which contains in its molecule at least one aliphatic unsaturated group substantially non-reactive with the polyester (A) and the aliphatic unsaturated group of the reactive compound (B) under conditions of melt-blending with the polyester (A) and at least one epoxy group reactive with the polyester (A) under the melt-blending conditions. The cured linear aromatic polyester composition can be prepared by extruding the uncured linear aromatic polyester composition under melting conditions, and subjecting the resulting extrudate to a curing treatment.

12 Claims, No Drawings

CURED AROMATIC POLYESTER COMPOSITION AND PROCESS FOR ITS PRODUCTION

This invention relates to a cured or uncured linear aromatic polyester composition melt-blended and composed of a saturated aromatic linear polyester and a reactive compound containing in its molecular structure at least one aliphatic unsaturated group which is substantially non-reactive with the polyester and the aliphatic unsaturated group of the reactive compound under conditions of melt-blending with the polyester and at least one epoxy group which is reactive with the polyester under the melt-blending conditions. The invention also relates to a process for preparing this composition.

The composition has various improved properties such as superior mechanical properties, thermal stability, light stability, chemical resistance and dimensional stability. The uncured composition has an improved speed of curing, and the resulting cured composition has an improved crosslinking density. Thus, increased curing speeds and crosslinking densities can be achieved over the prior art suggested in our prior application (German Laid-Open Pat. No. 2745906).

Saturated aromatic linear polyesters such as polyethylene terephthalate and polybutylene terephthalate are very useful plastic materials for producing shaped articles such as films and filaments. These polymers, however, do not have entirely satisfactory thermal stability. For example, when exposed to high temperatures, they tend to decrease in the degree of polymerization and consequently decrease in mechanical strength. Their chemical resistance is also unsatisfactory, and they have only limited uses in fields which require sufficient chemical resistance, for example as filters or filter supports. These polyesters also do not have a sufficiently high Young's modulus, and are limited in uses which require a high Young's modulus.

Many attempts have been made in the past to improve the thermal stability and other properties of these polyesters by incorporating various additives, but all of them have encountered great difficulties in imparting satisfactory thermal stability and other properties without sacrificing the other desirable properties inherently possessed by the polyesters. Usually, an attempt to improve one property resulted in an appreciable deterioration in another.

If a shaped product having a satisfactory crosslinked structure can be obtained without impairing the melt-shapeability of a polyester, the utility of the polyester would increase, and its application would be broadened. Some proposals have been known for imparting a crosslinked structure to polyesters with such an intention.

For example, U.S. Pat. No. 3,518,175 discloses that a copolymer is prepared by using a comonomer such as benzophenonedicarboxylic acid in the preparation of a saturated linear polyester, and then the copolymer is exposed to ultraviolet irradiation to impart a crosslinking structure to the copolyester. However, according to this proposal, the reactivity is low in the crosslinkage-forming reaction, and it is impossible to form a firm crosslinked structure having a satisfactorily high crosslinking density.

Another proposal is disclosed in Japanese Laid-Open Patent Publication No. 78256/73 which comprises adding a free radical generator or both a free radical generator and a free radical transferring agent to a saturated thermoplastic polyester containing a hydrogen atom and/or halogen atoms which are active on free radicals, and then heating the mixture to crosslink the polyester. According to this proposal, the addition of a free radical generator is essential, and before a crosslinkage is formed, it must be added by methods which do not raise the temperature to a point at which the free radical generator acts. Accordingly, as shown in Examples of this patent publication, an embodiment may be employed in which the free radical generator is added to a solution of the polyester in a solvent, the solvent is evaporated at room temperature, and then the residue is heat-treated (e.g., as adhesives, paints, etc.). It is virtually impossible however to apply the invention of this patent publication to the production of melt-shaped articles such as the production of fibers, films and sheets by injection-molding, extrusion molding, etc. In other words, the free radical generator must be stable under conditions of melt-mixing the polyester with the free radical generator or under conditions of melt-shaping the polyester. For crosslinking, melt-shaped articles prepared from the melt-blended composition must be heated to the melting temperature of the composition or higher at which the free radical generator becomes active. Thus, in practice, it is impossible to crosslink the melt-shaped article while its shape is retained.

For the purpose of introducing a crosslinking structure having such a low crosslinking density as to give a thickening effect to a linear saturated polyester, there are known a method involving the copolymerization of a small proportion of a polyfunctional compound, a method involving the addition of an epoxy compound, an isocyanate compound, etc., and a method involving the copolymerization of a small proportion of a compound having a reactive unsaturated groups such as 2-butene-1,4-diol. These methods induce crosslinking reaction by heat during the melt-polymerization of polyester or its melt-shaping. If the crosslinking reaction goes too far, the melt viscosity of the product increases extremely to make it difficult or impossible to shape the polyester. Accordingly, it is substantially impossible to increase the crosslinking density.

German OLS No. 2745906, the inventorship of which contains some of the coinventors of the present application, suggested a polyester composed of a saturated linear aromatic polyester in which at least 70 mole% of the acid component consists of an aromatic dicarboxylic acid and a polyallyl compound which contains not less than 2 allyl or substituted allyl groups in the molecule, does not decompose under conditions of melt-blending with the polyester, and is non-reactive with the polyester under conditions of melt-blending with the polyester in order to remove the troubles and defects of the conventional techniques mentioned hereinabove.

The present inventors have made investigations in order to provide an improved linear aromatic polyester composition having the various improved properties mentioned above and improved crosslinking speeds and crosslinking densities without impairing the desirable melt-shapability of the linear aromatic polyester.

These investigations have led to the discovery that the improved linear aromatic polyester composition can be obtained by replacing the polyallyl compound in the prior suggestion with a reactive compound which contains in its molecule at least one aliphatic unsaturated group which is substantially non-reactive with the polyester and the aliphatic unsaturated group of the reactive compound under conditions of melt-blending with the polyester and at least one epoxy group reactive under the melt-blending conditions.

It is an object of this invention therefore to provide a linear aromatic polyester composition having further improved properties and a process for its production.

The above and other objects and advantages of the invention will become more apparent from the following description.

The cured or uncured linear aromatic polyester composition of this invention is a polyester composition melt-blended and composed of (A) 100 parts by weight of a saturated linear aromatic polyester in which at least 70 mole% of the said component consists of an aromatic dicarboxylic acid, and (B) 0.1 to 50 parts by weight of a reactive compound which is solid at room temperature or is a liquid having a boiling point of at least 200° C. under atmospheric pressure, and which contains in its molecule at least one aliphatic unsaturated group substantially non-reactive with the polyester (A) and the aliphatic unsaturated group of the reactive compound (B) under conditions of melt-blending with the polyester (A) and at least one epoxy group reactive with the polyester (A) under the melt-blending conditions.

The saturated aromatic linear polyester (A) in the polyester composition of this invention is derived from an acid component at least 70 mole%, preferably at least 80 mole%, of which consists of an aromatic dicarboxylic acid or its functional derivative, and a glycol. Examples of the acid component are terephthalic acid, isophthalic acid, nahthalenedicarboxylic acid, diphenyldicarboxylic acid, diphenylsulfonedicarboxylic acid, diphenoxyethanedicarboxylic acid, diphenyletherdicarboxylic acid, methylterephthalic acid, and methylisophthalic acid. Of these, terephthalic acid is most preferred.

Other carboxylic acids may be used in an amount of not more than 30 mole%, preferably not more than 20 mole%, together with the aromatic dicarboxylic acid as the acid component. Examples of such carboxylic acids are aliphatic dicarboxylic acids such as succinic acid, adipic acid, sebacic acid, decanedicarboxyic acid or dodecanedicarboxylic acid; alicyclic dicarboxylic acids such as hexahydroterephthalic acid; hydroxycarboxylic acids such as ε-hydroxycaproic acid, hydroxybenzoic acid and hydroxyethoxybenzoic acid; and ester-forming derivatives of these such as their lower alkyl esters or aryl esters.

Examples of the glycol component of the polyester (A) include ethylene glycol, trimethylene glycol, tetramethylene glycol, neopentylene glycol, hexamethylene glycol, decamethylene glycol, cyclohexane dimethylol, 2,2-bis(β-hydroxyethoxyphenyl)propane, hydroquinone, and 2,2-bis(hydroxyphenyl)propane. Of these, ethylene glycol and tetramethylene glycol are especially preferred.

The polyester (A) has an intrinsic viscosity [η], measured at 35° C. in o-chlorophenol, of preferably at least 0.4, more preferably at least 0.5.

The saturated linear aromatic polyester used in this invention can be produced in a customary manner by reacting an acid component exemplified hereinabove with a glycol component. This reaction can be performed, for example, at a temperature of about 150° to 320° C. at atmospheric pressure in a stream of an inert gas or under reduced pressure. It is preferred to use a catalyst in this reaction. Examples of suitable polymerization catalysts are antimony compounds, germanium compounds and titanium compounds. If desired, the polyester may contain copolymerized therein a monofunctional compound such as benzoic acid or benzoylbenzoic acid or a polyfunctional compound such as pentaerythritol, trimethylolpropane, pyromellitic acid or trimetallitic acid in amounts which do not substantially causing a loss of its linearity.

The reactive compound (B) used in this invention is a solid at room temperature, or a liquid having a boiling point of at least 200° C. under atmospheric pressure. The reactive compound (B) contains in its molecule at least one aliphatic unsaturated group substantially non-reactive with the polyester (A) and the aliphatic unsaturated group of the reactive compound (B) when maintained under conditions of melt-blending with the polyester, preferably at a temperature 20° C. higher than the melting point of the polyester, for about 15 minutes in an inert gas such as nitrogen gas, and at least one epoxy group reactive with the polyester (A) under the aforesaid melt-blending conditions.

Suitable aliphatic unsaturated groups are non-conjugated aliphatic unsaturated groups. Preferred aliphatic unsaturated groups are non-conjugated groups containing at least one hydrogen atom at the α-carbon to the double bond, such as an allyl or substituted allyl group, as expressed by the following general formula

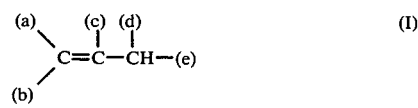

In the group of general formula (I), the bonds (a), (b), (c) and (d) are bonded either to a hydrogen atom or an organic group, and the bond (e) is bonded to an organic group. The organic groups bonded to the bonds (a), (b), (c), (d) and (e) are independent from each other, or together form a cyclic structure. In the latter case, the double bond in formula (I) may form part of the cyclic structure. The cyclic structure may be an alicyclic structure, a heterocyclic structure, etc., but is never an aromatic ring.

A more preferred structure of the group of formula (I) is expressed by the following general formula (II).

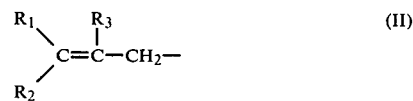

wherein $R_1$, $R_2$ and $R_3$ are identical or different, and each represent a member selected from the group consisting of a hydrogen atom and organic groups.

The organic groups represented by $R_1$, $R_2$ and $R_3$ are preferably alkyl groups with 1 to 6 carbon atoms, more preferably alkyl groups with 1 to 3 carbon atoms. Allyl, methallyl and crotyl groups and preferred among the groups of formula (II). An allyl group is especially preferred.

The epoxy group in compound (A) is expressed by the following general formula

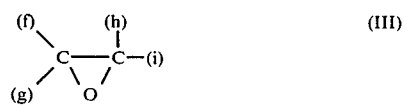

In the formula, the bonds (f), (g) and (h) are bonded to hydrogen atoms or organic groups, and bond (i) or bonds (i) and (g) are organic moieties including general formula (I) or (II) above. The organic groups bonded to the bonds (f), (g), (h) or (i) are independent from each other, or form a cyclic structure together with the bonds (a), (b), (c), (d), and (e) or with the organic groups bonded to these bonds. Preferred groups bonded to those bonds in formula (III) which are other than the ones bonded to organic groups containing groups of formula (I) or (II) are hydrogen groups or alkyl groups with 1 to 6 carbon atoms. Preferred epoxy groups of formula (III) are glycidyl, 2,3-epoxy-2-methylpropyl and 2,3-epoxybutyl. The glycidyl group is especially preferred.

The reactive compound (B), when melt-blended with the polyester under conditions of melt-blending with the polyester, should not substantially form an insoluble matter which is insoluble in o-chlorophenol at 35° C., and should not cause an appreciable decrease in the intrinsic viscosity [$\eta$] of the polyester (for instance, a decrease to less than 0.3). For example, compounds containing highly reactive ester-forming functional groups other than the epoxy group (for example, highly reactive esters, highly reactive hydroxyl group, highly reactive carboxyl group, etc.), and compounds which decompose or gasify at the melting temperature of the polyester are unsuitable.

The reactive compound (B) used in this invention contains in its molecule at least one, preferably at least 2, for example 2 to 4, liphtic unsaturated groups substantially non-reactive with the polyester (A) and the aliphatic unsaturated groups of the reactive compound (B) and at least one, preferably 1 or 2, epoxy group reactive with the polyester (A).

Preferred examples of the compound (B) are expressed by the following formula $$\{(AQ_1)_mX\}_nQ\{Y(Q_2B)_{m'}\}_{n'} \qquad (IV)$$

wherein A represents a group having the structure expressed by formula (I), preferably an allyl or substituted allyl group expressed by formula (II); B represents an epoxy group having the structure expressed by formula (III); X represents a direct bond, —O—,

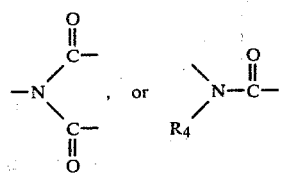

in which $R_4$ represents a hydrogen atom, an alkyl group having 1 to 6 carbon atoms, or $AQ_1$—; Y represents a direct bond, —O—, or —NH—; Q represents an organic group having a valence of 2 to 4; $Q_1$ and $Q_2$ represent a direct bond or an organic group having a valence of 2 to 4; and n, m, n' and m' are positive integers.

More preferred species of the compound of general formula (IV) are compounds (i) to (iii) below.

(i) Cyanuric acid or isocyanuric acid derivatives corresponding to general formula (IV) in which X and Y represent a direct bond; Q represents

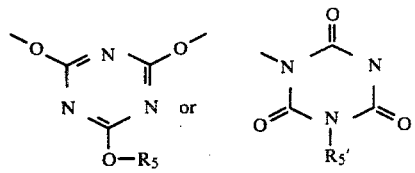

in which $R_5$ and $R_5'$ represent an alkyl group, $AQ_1$—, or $BQ_2$—; $Q_1$ and $Q_2$ represent a direct bond or an alkylene group with 1 to 5 carbon atoms; and each of n, m, n' and m' is 1.

(ii) Imide or amide compounds corresponding to general formula (IV) wherein X is

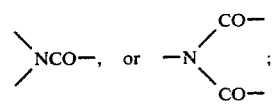

Q represents an aliphatic group having a valence of 2 to 4 and containing 2 to 20 carbon atoms, an alicyclic group having a valence of 2 to 4 and containing 4 to 12 carbon atoms, a group having a valence of 2 to 4 and comprising

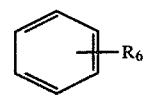

(in which $R_6$ represents a hydrogen atom, an aryl group with 6 to 12 carbon atoms, an alkyl group with 1 to 6 carbon atoms, an alkyloxy group with 1 to 6 carbon atoms, a nitro group or a halogen atom), a group having a valence of 2 to 4 and comprising

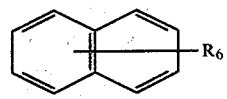

(in which $R_6$ is as defined above), or a group having a valence of 2 to 4 and comprising

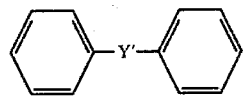

(in which Y' represents a member of the group consisting of —O—, —CO—, —SO$_2$—, —NR$_6'$—, $R_6'$ being a hydrogen atom or an alkyl group with 1 to 6 carbon atoms, —O(CH$_2$CH$_2$)$_l$O—, l being an integer of 1 to 3, and alkylene groups with 2 to 12 carbon atoms); and $Q_1$ and $Q_2$ are the same as defined in (i) above. Preferred aliphatic groups Q are alkylene groups with 2 to 20 carbon atoms, divalent olefin residues having the structure of general formula (I), and

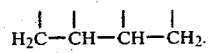

Preferred alicyclic groups Q are groups having a valence of 2 to 4 and comprising groups having a valence of 2 to 4 and comprising

and groups having a valence of 2 to 4 and comprising

(iii) Compounds corresponding to general formula (IV) in which X represents —O— or a direct bond; Q is the same as Q in (ii), with the proviso that when X is —O—, Q is preferably an aliphatic or alicyclic group; and $Q_1$ and $Q_2$ are the same as $Q_1$ and $Q_2$ in (i).

Specific examples of the reactive compound (B) of the above formulae suitable for use in the present invention are listed below.

(i) Cyanuric or isocyanuric acid derivatives

Diallyl (or dimethallyl, or dicrotyl)glycidyl cyanurate,
diallyl (or dimethallyl, or dicrotyl)glycidyl isocyanurate,
allyl (or methallyl, or crotyl)diglycidyl cyanurate,
allyl (or methallyl, or crotyl)diglycidyl isocyanurate,
diallyl-(2,3-epoxy-2-methylpropyl)cyanurate,
dimethallyl-(2,3-epoxy-2-methylpropyl)cyanurate,
diallyl-(2,3-epoxy-2-methylpropyl)isocyanurate,
dimethallyl-(2,3-epoxy-2-methylpropyl)isocyanurate,
dicrotyl-(2,3-epoxy-2-methylpropyl)isocyanurate,
diallyl-(2,3-epoxybutyl)cyanurate,
diallyl-(2,3-epoxybutyl)isocyanurate,
dimethallyl-(2,3-epoxybutyl)cyanurate,
dimethallyl-(2,3-epoxybutyl)isocyanurate,
dicrotyl-(2,3-epoxybutyl)isocyanurate,
diallyl-(2,3-epoxy-2-methylbutyl)cyanurate, and diallyl-(2,3-epoxy-2-methylbutyl)isocyanurate.

(ii) Amide or imide compounds

N-allyl (or methallyl, or crotyl)glycidyloxy benzamide,
N,N-diallyl (or dimethallyl, or dicrotyl)glycidyloxy benzamide,
N,N'-diallyl (or dimethallyl, or dicrotyl) glycidyloxy terephthalamide,
N,N,N',N'-tetrallyl (or tetramethallyl, or tetracrotyl)glycidyloxy isophthalamide,
N,N,N',N'-tetrallyl (tetramethallyl, or tetracrotyl)glycidyloxy terephthalamide,
N,N-diallyl (or dimethallyl, or dicrotyl)-2,3-(or 3,4-)epoxycyclohexanecarboxamide,
N,N'-diallyl (or dimethallyl, or dicrotyl)-2,3-(or 4,5)epoxycyclohexane-1,2-dicarboxamide,
N,N,N',N'-tetrallyl (or tetramethallyl, or tetracrotyl)-3,4-(or 4,5-)epoxycyclohexane-1,2-dicarboxamide,
N,N'-diallyl (or dimethallyl, or dicrotyl)-2,3-(or 3,4-)epoxycyclohexane-1,1-dicarboxamide,
N,N,N',N'-tetrallyl (or tetramethallyl, or tetracrotyl)-2,3-(or 3,4-)epoxycyclohexane-1,1-dicarboxamide,
N,N'-diallyl (or dimethallyl, or dicrotyl)-2,3-epoxycyclohexane-1,4-dicarboxamide,
N,N'-dialyl (or dimethallyl, or dicrotyl)-2,3-(or 3,4-)epoxyhexane-1,6-dicarboxamide,
N,N,N',N'-tetrallyl (or tetramethallyl, or tetracrotyl)-2,3-(or 3,4-)epoxyhexane-1,6-dicarboxamide,
N,N'-diallyl (or dimethallyl, or dicrotyl)-2,3-epoxybutane-1,4-dicarboxamide,
N,N,N',N'-tetrallyl (or tetramethallyl, or tetracrotyl)-2,3-epoxybutane-1,4-dicarboxamide,
N-allyl (or methallyl, or crotyl)glycidyloxyphthalimide,
N-allyl-(2,3-epoxy-2-methylpropyloxy)benzamide,
N-methallyl-(2,3-epoxy-2-methylpropyloxy)benzamide,
N,N-diallyl-(2,3-epoxy-2-methylpropyloxy)benzamide,
N,N-dimethallyl-(2,3-epoxy-2-methylpropyloxy)benzamide,
N,N'-diallyl (or dimethallyl)-(2,3-epoxybutyloxy)isophthalamide,
N,N'-diallyl (or dimethallyl)-(2,3-epoxybutyloxy)-terephthalamide,
N,N,N',N'-tetrallyl (or tetramethallyl)-(2,3-epoxy-2-methylpropyloxy)isophthalamide, and
N,N,N',N'-tetrallyl (or tetramethallyl)-(2,3-epoxy-2-methylpropyloxy)terephthalamide.

(iii) Other compounds 2,2-bis[3-allyl (or methallyl, or crotyl)-4-glycidyloxyphenyl]propane,
1,1-bis[3-allyl (or methallyl, or crotyl)-4-glycidyloxyphenyl]cyclohexane,
[2-allyl (or methallyl or crotyl)phenyl]-glycidyl ether,
[2,6-diallyl (or dimethallyl, or dicrotyl)phenyl]glycidyl ether,
1,4-diglycidyloxy-2,6-diallyl (or dimethallyl, or dicrotyl)benzene,
2,2-bis[3,5-diallyl (or dimethallyl, or dicrotyl)-4-glycidyloxyphenyl]propane,
[2,4,6-triallyl (or trimethallyl, or tricrotyl)phenyl]-glycidyl ether,
3,3'-diallyl (or dimethallyl, or dicrotyl)-4,4'-diglycidyloxybenzophenone,
bis[3-allyl (or methallyl, or crotyl)-4-glycidyloxyphenyl]ether,
bis[3,5-diallyl (or dimethallyl, or dicrotyl)-4-glycidyloxyphenyl]sulfone,
2,2-bis[3-allyl (or methallyl)-4-(2,3-epoxy-2-methylpropyloxy)phenyl]propane,
1,1-bis[3-allyl (or methallyl, or crotyl)-4-(2,3-epoxy-2-methylpropyloxy)phenyl]cyclohexane,
[2-allyl (or methallyl)phenyl]-(2,3-epoxy-2-methylpropyl)ether,
[2,6-diallyl (or dimethallyl)phenyl]-(2,3-epoxy-2-methylpropyl)ether,
[1,4-bis(2,3-epoxy-2-methylpropyloxy)]2,6-diallyl (or dimethallyl, or dicrotyl)benzene,
2,2-bis[3,5-diallyl (or dimethallyl, or dictoryl)-4-(2,3-epoxy-2-methylpropyloxy)phenyl]propane,
[2,4,6-triallyl (or trimethallyl, or tricrotyl)phenyl]-(2,3-epoxy-2-methylpropyl)ether,
3,3'-diallyl (or dimethallyl, or dicrotyl)-4,4'-bis(2,3-epoxy-2-methylpropyloxy)benzophenone, bis[3-allyl (or methallyl, or crotyl)-4-(2,3-epoxy-2-methylpropyloxy)phenyl]ether, bis[3,5-diallyl (or dimethallyl, or dicrotyl)-4-(2,3-epoxy-2-methylpropyloxy)phenyl]sulfone, 2,2-bis[3-allyl-4-(2,3-epoxybutyloxy)phenyl]propane, 1,1-bis[3-allyl-4-(2,3-epoxybutyloxy)phenyl]cyclohexane, (2-allylphenyl)-(2,3-epoxybutyl)ether, (2,6-diallylphenyl)-(2,3-epoxybutyl)ether, 1,4-bis(2,3-epoxybutyloxy)-2,6-diallyl (or dimethallyl)benzene, 2,2-bis[3,5-diallyl (or dimethallyl)-4-(2,3-epoxybutyloxy)phenyl]propane, (2,4,6-triallylphenyl)-(2,3-epoxybutyl)ether, 3,3'-diallyl (or dimethallyl)-4,4'-bis(2,3-epoxybutyloxy)benzophenone, bis[3-allyl-4-(2,3-epoxybutyloxy)phenyl]ether, bis[3,5-diallyl-4-(2,3-epoxybutyloxy)phenyl]sulfone, and

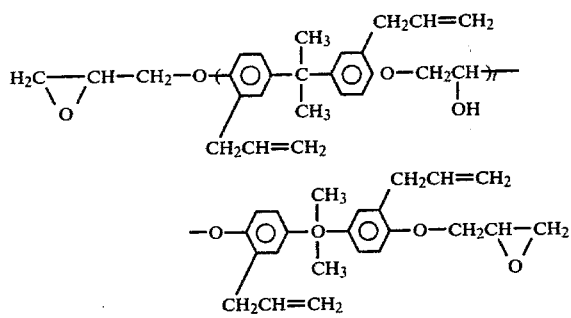

(t is a natural number, preferably about 1 to 20).

Of the above compounds, those of groups (i) and (ii), especially the former, are preferred.

The cured or uncured linear aromatic polyester composition of this invention contains 100 parts by weight of the saturated aromatic linear polyester (A) and 0.1 to 50 parts by weight of the reactive compound (B). Preferably, the amount of the compound (B) is 0.5 to 40 parts by weight, more preferably 0.5 to 20 parts, especially 1.0 to 20 parts by weight, per 100 parts by weight of the polyester (A).

The composition of this invention can be obtained by mixing the polyester (A) and the reactive compound (B) by any desired mixing means capable of affording uniform mixtures. Mixing is performed by using a mechanical mixing means such as an S-type blender or V-type blender, and then using a kneader of an extruding machine at a temperature at which the polyester (A) becomes molten or higher, preferably from the melting point of the polyester (A) to a point about 60° C. higher than the melting point.

The composition of this invention may contain various additives. Examples of the additives include oxidation or heat stabilizers of the hindered phenol, phosphorus compound and sulfur compound types such as

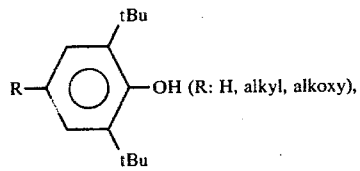

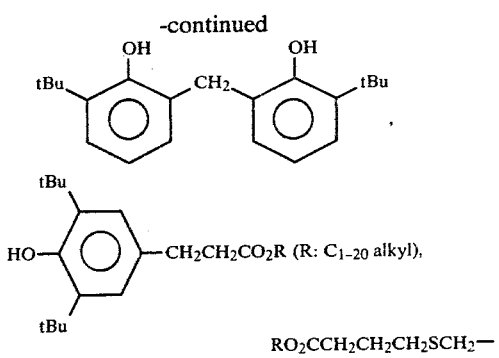

$RO_2CCH_2CH_2CH_2SCH_2-$ $CH_2CO_2R$ (R: $C_{1-20}$ alkyl), phosphoric acid, phosphorous acid, phosphonic acid, phosphonous acid, phosphinic acid, phosphinous acid, phosphine oxide, phosphine, and alkyl or aryl esters of these; coloring agents such as titanium oxide, carbon black, 1,5-dihydroxy-4,8-diaminoanthraquinone, 1,5-dihydroxy-4,8-diamino-2-phenylanthraquinone, 1-amino-2-cyano-4-methylaminoanthraquinone, 1-methyl-amino-4-toluidinoanthraquinone, 1,4-bisbenzylaminoanthraquinone, 1,4-diethylaminoanthraquinone, 1,4-dihexylaminoanthraquinone, 1-(2'6'-dimethylanilino)-4,5,8-trihydroxyanthraquinone, 1-(2',4', 6'-trimethylanilino)-4,5,8-trihydroxyanthraquinone, 1-(2',6'-diethylanilino)-4,5,8-trihydroxyanthraquinone, and 1-(2'-methyl-6'-ethylanilino)-4,5,8-trihydroxyanthraquinone; fluorescent bleaching agents such as those available under the trademark Blankophor (BASF), Unitex (Ciba), Tinopal (Geigy Chemical), Leucophor (Sandoz), Kaycoll (Nippon Soda), Kayahor (Nippon Kayaku), and Whitex (Sumitomo Chemical); photo-reaction initiators such as those of the general formula $[R_8—(Z'-R_7)_a]_b(Z)_c$ (to be described hereinbelow); inorganic and organic fire retardants, for example antimony compounds such as antimony trioxide, phosphorous compounds cited as those exemplified above as heat stabilizers, and halogen compounds such as hexabromobenzene, decabromobiphenyl, decabromobiphenyl ether, polycarbonates of tetrabromobisphenol A (degree of polymerization 2–30) and octabromobiphenyl; nucleating agents, lubricants or fillers such as silica, calcium carbonate, aluminum silicate, calcium phosphate, alumina, barium sulfate, magnesium sulfate (talc), diatomaceous earth, glass fibers, and carbon fibers; and other stabilizers such as carbodiimide and epoxide compounds.

Preferred photo-reaction initiators are those of the general formula $[R_8—(Z'-R_7)_a]_b(Z)_c$ given hereinabove wherein at least one of $R_8$ and $R_7$ is an aromatic group, and the other is an aromatic group with 6 to 12 carbon atoms, an aliphatic group with 1 to 10 carbon atoms or an alicyclic group with 5 to 12 carbon atoms, $R_8$ and $R_7$ may be identical to or different from each other, and $R_8$ and $R_7$ may be bonded to each other either directly or through a group selected from the class consisting of —O—, —S—, —SO$_2$— and —CO—; Z' is a group represented by

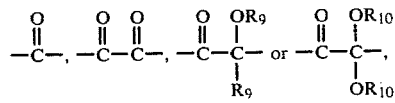

in which $R_9$ is a hydrogen atom, an alkyl group with 1 to 10 carbon atoms, an aryl group with 6 to 12 carbon atoms or a cycloalkyl group with 5 to 10 carbon atoms with the two R$_9$ groups being identical to or different from each other, R$_{10}$ is an alkyl group with 1 to 10 carbon atoms or a cycloalkyl group with 5 to 10 carbon atoms with the two R$_{10}$ groups being identical to or different from each other, the two R$_9$ groups or R$_{10}$ groups each may be bonded to each other, or one of the two R$_9$ or R$_{10}$ groups may be bonded to R$_8$ or R$_7$, respectively, and Z is a group bonded to R$_7$, and represents —O—, —S—, —SO—, or a divalent or higher organic group. In the above general formula, R$_1$-(O-)$_p$ and

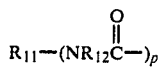

are examples of the organic group represented by Z. In these formulae, R$_1$, is a C$_{1-10}$ aliphatic, C$_{6-12}$ aromatic or C$_{5-12}$ alicyclic group having a valence of p; R$_{12}$ is a hydrogen atom or an alkylene group with 1 to 10 carbon atoms; and p is an integer of at least 2, for example 2 to 6.

When c equals 0 in the above formula, the compound is expressed by R$_8$—(Z'-R$_7$)$_a$, and when c is 1, the compound is expressed by [R$_8$—(Z'-R$_7$)$_a$]$_b$Z.

Examples of the aromatic group represented by R$_8$ or R$_7$ are group composed of a benzene ring, a group composed of a naphthalene ring, and a group composed of a benzene or naphthalene ring which is substituted with a group selected from the class consisting of alkyl with 1 to 10 carbon atoms, cycloalkyl with 5 to 10 carbon atoms, aryl with 6 to 12 carbon atoms, nitro, alkoxy with 1 to 10 carbon atoms and aryloxy with 6 to 12 carbon atoms. The group composed of a benzene ring is especially preferred.

Examples of the aliphatic group are alkyl groups with 1 to 10 carbon atoms and alkylene groups with 1 to 10 carbon atoms.

Specific examples of the photo-reaction initiators of the above general formula are benzophenone, 4-methylbenzophenone, 4-nitrobenzophenone, 3-methylbenzophenone, 4,4'-dimethylbenzophenone, 3,3'-dimethylbenzophenone, 3,4'-dimethylbenzophenone, 4-phenylbenzophenone, 3-phenylbenzophenone, 3,3'-dinitrobenzophenone, 4,4'-dinitrobenzophenone, 3-nitrobenzophenone, 4-methoxybenzophenone, 3-methoxybenzophenone, 4,4'-dimethoxybenzophenone, 3,3'-dimethoxybenzophenone, bis(4-diphenyl)ketone, bis(3-diphenyl)ketone, 3,4-dimethylbenzophenone, 3,4,3',4'-tetramethylbenzophenone, Michler's ketone, anthraquinone, nitroanthraquinone, phenanthraquinone, acetophenone, propiophenone, benzil, benzoin, benzoin methyl ether, benzoin ethyl ether, benzoin propyl ether, benzoin butyl ether, benzoin phenyl ether, α-methylbenzoin methyl ether, α-phenylbenzoin ethyl ether, α-benzylbenzoin ethyl ether, benzil dimethyl ketal, benzil diethyl ketal, benzil dipropyl ketal, benzil ethylene ketal, benzil trimethylene ketal, benzil neopentylene ketal, benzil bis(2-methoxyethyl)ketal, naphthyl phenyl ketone, bisnaphthyl ketone, ethylenebis(benzoylbenzamide), tetramethylenebis(benzoylbenzamide), hexamethylenebis(benzoylbenzamide), decamethylenebis(benzoylbenzamide), dodecamethylenebis(benzoylbenzamide), hexamethylenebis(4-acetylbenzamide), hexamethylenebis[(4-methylbenzoyl)benzamide], ethylenebis[(4-nitrobenzyl)benzamide], dodecamethylenebis[(4-methoxybenzoyl)benzamide], dibenzoyl benzene, bis(4-methylbenzoyl) benzene, ethylenebis(benzoylphenyl ether), bis(benzoylmethyl) ether, tris(benzoylphenoxy) benzene, and bis(4-methoxybenzoylmethyl) ether.

The photo-reactive compounds disclosed in German OLS Nos. 1769168, 17698653, 1807297, 1807301, 1919678, and 1949010 can also be used in this invention.

The amounts of the aforesaid additives can be selected as desired. For example, the amounts per 100 parts by weight of the polyester (A) may be not more than about 10 parts by weight, preferably about 0.05 to about 5 parts by weight, for the oxidation or heat stabilizers; not more than about 10 parts by weight, preferably about 0.01 to about 5 parts by weight for the coloring agents; not more than about 10 parts by weight, preferably about 0.01 to about 5 parts by weight, for the optical brighteners; 0.01 to 20 parts by weight, preferably 0.05 to 10 parts by weight, more preferably 0.1 to 5 parts by weight, especially preferably 0.1 to 3 parts by weight, for the photo-reaction initiators; not more than 30 parts by weight, preferably 1 to 20 parts by weight, for the fire retardants; and not more than about 50 parts by weight, preferably about 0.1 to about 30 parts by weight, for the nucleating agents, lubricants or fillers.

The uncured composition of this invention may be formed into various shaped articles by conventional means. The shaped articles may, for example, be films, sheets, filaments, fibers, yarns, and other articles of various shapes such as tubes or pipes. Shaping of the composition can be performed by various known means such as melt spinning, melt film formation, melt injection molding, melt extrusion molding, and melt transfer molding. The shaping can be performed at a temperature above the melting point of the polyester (A), preferably from the melting point of the polyester to a point at which the polyester does not decompose, preferably to a point about 60° C. higher than the melting point. In the present invention, the above composition is preferably in the form of films or filaments, especially stretched or unstretched films or filaments.

In order to increase the reactivity of the epoxy group of reactive compound (B) with the terminals of the polyester (A) during the melt-blending or melt-shaping step, a small amount, of say, not more than about 5 mole% based on the polyester, of an acid anhydride such as succinic anhydride may be added preferably.

The curing treatment of the uncured composition of this invention in the form of a shaped article can be performed at any desired stage after the shaping.

The curing treatment may be performed on unstretched films or filaments, or films or filaments which have been formed, and oriented by stretching and optionally heat-treated. After the curing treatment, the shaped article may be stretched or heat-treated.

The curing treatment can be performed, for example, by the following procedures.

(1) Application of ultraviolet irradiation to the composition at a temperature of from room temperature to a temperature lower than the decomposition temperature of the polyester, preferably from the second order transition point (Tg: °C.) to melting point (Tm: °C.) of the polyester, preferably from (Tg+10° C.) to Tm, more preferably from (Tg+10° C.) to (Tm−10° C.), for a period of 0.5 second to 1 hour, preferably 1 second to 30 minutes, more preferably 2 seconds to 10 minutes, and especially 5 seconds to 5 minutes, preferably in the presence of a photo-reaction initiator of the types exemplified hereinabove.

(2) Application of electron beams to the composition in a dose of 0.01 Mrad to 100 Mrads at a temperature of from room temperature to Tm, preferably from Tg to (Tm−10° C.), more preferably from (Tg+10° C.) to (Tm+20° C.).

The above procedures (1) and (2) may be used in combinations.

It has been confirmed that the composition becomes insoluble in solvents and the intrinsic viscosity of the polyester increases as a result of the curing treatment.

While crosslinked shaped articles normally do not have an appreciable degree of flexibility and are brittle, the cured composition of this invention in the form of a shaped article has sufficient flexibility and is insoluble in solvents such as ortho-chlorophenol and thus has a high level of chemical resistance. Furthermore, it has a high level of thermal stability such that it does not melt nor deform even at 300° C. When the composition of this invention is formed into fibers or films, these articles have outstandingly good retention of mechanical properties in the air at high temperatures.

The present invention can, with commercial advantage, afford a cured polyester composition in the form of a desired shaped article which has improved properties such as superior chemical resistance, thermal stability, light stability, dimensional stability and mechanical properties, and an uncured polyester composition which can be converted to the cured composition having an increased crosslinking density at an increased speed of curing.

The curing procedure (1) is especially preferred since it is simple and can be performed within relatively short periods of time.

According to one embodiment of this invention, there can be provided an electric insulating material having superior thermal stability and electrical characteristics while retaining the good processability of the polyester (A). In this embodiment, it is preferred to use the reactive compound (B) in an amount of about 0.1 to 8 parts by weight per 100 parts by weight of the polyester (A).

The following Examples illustrate the present invention more specifically.

In these examples, all parts are by weight. The intrinsic viscosities are values measured in o-chlorophenol at 35° C. The strength, elongation and Young's modulus of the shaped articles were measured at a pulling speed of 100% min. using a tensile tester (Model TM-M; a product of Instron Engineering Company).

The other properties were measured by the following methods.

(1) Heat distortion temperature (TD$^a$)

A piece of film, 1 cm in width and 3 cm in length, is placed on an edge having a width of 3.5 cm, and 10 g of a load is exerted on the center of the film. In this state, the film and the edge are placed in a silicone oil. The silicone oil is heated at a rate of 5° C./minute, and the temperature at which the central part of the film is deformed 1 cm downward is measured. This temperature is defined as the heat distortion temperature TD$^a$.

(2) Heat distortion temperature (TD$^b$)

The same film as used in (1) was dipped in a silicone oil in the vertical direction, and a load of 50 g is exerted on the lower part of the film. In this state, the silicone oil is heated at a rate of 5° C./minute. The temperature at which the lower portion of the film is deformed as a result of stretching 2 cm is measured. This temperature is defined as the heat distortion temperature (TD$^b$).

(3) Chemical resistance (to o-chlorophenol)

0.1 Part of a film is heated at 100° C. for 1 hour in o-chlorophenol. The proportion (weight %) of the insoluble portion is determined.

(4) Chemical resistance (to acetone)

The sample film is dipped in acetone at room temperature, and its state is observed.

(5) Heat shrinkage

The sample is maintained for 2 hours in hot air at a predetermined temperature without restraining its length, and the percentage of the shrunken dimension of the the sample after the heat-treatment based on the dimension before the heat-treatment is determined, and defined as "heat shrinkage".

(6) Degree of delamination

A film sample, more than 8.0 mm in width and 8.0 cm in length, is placed on a concave mold having a groove with a length 10 cm and a width of 3.0 mm. Then, a convex mold is abruptly inserted into the concave mold to a depth of more than 5 mm from above the groove by means of pressurized air. The maximum width (mm) of a non-transparent portion formed on both side surfaces of the resulting ⊐-shaped article is measured at a part more than 1 cm inwardly of both ends of the sample, and made a measure of the degree of delamination.

(7) Elongation life at 190° C.

The time (hours) which elapses until the elongation of the sample decreases to 50% of the initial value.

(8) Strength life at 190° C.

The time (hours) which elapses until the strength of the sample decreases to 50% of the initial value.

EXAMPLE 1 AND COMPARATIVE EXAMPLE 1

Polyethylene terephthalate pellets (intrinsic viscosity 0.69; 100 parts) and 5 parts of 2,2-bis(3-allyl-4-glycidyloxyphenyl)propane were mixed well by an S-type blender, and the mixture was extruded through an extruder at 280° C. to form pellets. The pellets had an intrinsic viscosity of 0.66. The pellets were melt-extruded at 275° C. through a spinneret with an inside nozzle diameter of 0.5 mm to form undrawn filaments. The resulting undrawn filaments were drawn to 5.1 times at 80° C., and then heat-treated at 220° C. while it was drawn to 1.05 times. The drawn filaments had an intrinsic viscosity of 0.63, a tenacity of 6.0 g/de and an elongation of 19.5%. To examine the thermal stability of these filaments, the filaments were allowed to stand in a Geer's aging tester at 190° C. for 350 hours. The filaments treated had a tenacity of 3.6 g/de (retention 60%), and an elongation 12.7% (retention 65%).

For comparison, drawn filaments having an intrinsic viscosity of 0.65, a tenacity of 6.3 g/de and an elongation of 20.3% were prepared in the same way as in the above procedure except that 2,2-bis(3-allyl-4-glycidyloxyphenyl)propane was not added. The drawn filaments were allowed to stand in a Geer's aging tester at 190° C. for 350 hours. The treated filaments had a tenacity of 3.2 g/de (retention 51%) and an elongation of 9.1% (retention 44%). It is seen therefore that the filaments in accordance with this invention have an especially high retention of elongation.

EXAMPLES 2 TO 6 AND COMPARATIVE EXAMPLE 2

Polyethylene terephthalate pellets (intrinsic viscosity 0.68; 100 parts) and each of the compounds (B) shown in Table 1 in the amounts indicated were well mixed by an S-blender. Then, the mixture was extruded by an extruder at 280° C., and the resulting pellets were pulverized to a size of 10 to 20 mesh. The resulting composition was allowed to stand for 1 day at 210° C. in a hot air Geer's aging tester. The decrease of intrinsic viscosity of the polyethylene terephthalate, which is a measure for a decrease in the degree of polymerization, was measured, and the results are shown in Table 1.

For comparison, polyethylene terephthalate alone was shaped and tested in the same way as above. The results are also shown in Table 1.

Table 1

| | Compound (B) and its amount (parts) | Intrinsic viscosity Before treatment | After treatment at 210° C. for 1 day |
|---|---|---|---|
| Example 2 | 1,1-bis(3-allyl-4-glycidyloxyphenyl)cyclohexane (5) | 0.61 | Insoluble in o-chlorophenol |
| Example 3 | (2,6-diallylphenyl)glycidyl ether (5) | 0.63 | Insoluble in o-chlorophenol |
| Example 4 | 4-glycidyloxy-N,N-diallylbenzamide (3) | 0.61 | 1.04 |
| Example 5 | 4-glycidyloxy-N,N-dimethallylbenzamide (3) | 0.62 | 1.07 |
| Example 6 | [complex structure with CH$_2$—CH=CH$_2$, CH$_3$ groups, bisphenol-type backbone with glycidyl and allyl groups] (t = 3 on an average) (3) | 0.59 | Insoluble in o-chlorophenol |
| Comparative Example 2 | None | 0.68 | 0.45 |

Table 2

| | Compound (B) | Amount (parts) | Elongation life (hours) |
|---|---|---|---|
| Example 7 | Diallyl glycidyl isocyanurate | 3 | 110 |
| Example 8 | Diallyl glycidyl cyanurate | 2 | 100 |
| Example 9 | N,N-diallyl-4-glycidyloxy benzamide | 3 | 120 |
| Comparative Example 3 | None | — | 48 |

The above results demonstrate that the compositions in accordance with this invention all showed an increase in intrinsic viscosity, and had superior thermal stability, and their chemical resistance was increased by heat-treatment.

EXAMPLES 7 TO 9 AND COMPARATIVE EXAMPLE 3

Polyethylene terephthalate (intrinsic viscosity 0.65; 100 parts) was mixed with each of the compounds (B) shown in Table 2 in the amounts indicated. The mixture was melted at about 280° C., and extruded through a T-die to obtain a film having a thickness of about 500μ. The film was then stretched to about 3.5 times at about 80° C. both in the longitudinal and transverse directions, and then heat-treated at 230° C. for 30 seconds at constant length.

The resulting film was allowed to stand in a Geer's aging tester at 190° C., and the time (heast-stable life) which elapsed until its elongation reaction became 50% was measured. The results are shown in Table 2.

For comparison, polyethylene terephthalate alone was shaped and tested in the same way as above. The results are also shown in Table 2.

EXAMPLES 10 TO 13 AND COMPARATIVE EXAMPLE 4

Polyethylene terephthalate (intrinsic viscosity 0.64; 100 parts by weight) was mixed well with each of the reactive compounds (B) indicated in Table 3 and each of the photo-reaction initiators shown in Table 3 in the amounts indicated by an S-type blender. The mixture was melted at 280° C., extruded through a T-die, and quenched to form a transparent amorphous film having a thickness of about 500μ. The film was placed on a hot plate, and exposed to ultraviolet irradiation from a 2 KW high-pressure mercury lamp (30 W/cm) located at a distance of 30 cm from the film under the conditions shown in Table 3. The strength, elongation, heat distortion temperatures, and chemical resistance of each of the resulting films are shown in Table 3.

For comparison, polyethylene terephthalate having an intrinsic viscosity of 0.64 alone was shaped and tested in the same way as described above. The results are also shown in Table 3.

Table 3

| | | Ultraviolet irradiation conditions | |
|---|---|---|---|
| Compound (B) | Photo-reaction initiator | Hot plate temperature | Time |

Table 3-continued

| Example | (parts) | | (parts) | | (°C.) | (min.) |
|---|---|---|---|---|---|---|
| 10 | Diallyl glycidyl isocyanurate | (10) | Benzil dimethyl ketal | (1) | 110 | 2 |
| 11 | N,N-diallyl p-glycidyloxy benzamide | (5) | Benzoin ethyl ether | (1) | 110 | 1 |
| 12 | Dimethallyl glycidyl isocyanurate | (5) | Benzil ethylene ketal | (2) | 105 | 1.5 |
| 13 | Allyl diglycidyl isocyanurate | (8) | Benzil neopentylene ketal | (1) | 100 | 2 |
| Comparative Example 4 | — | | — | | — | — |

| | Properties of the film | | | | | |
|---|---|---|---|---|---|---|
| | | | Heat distortion temperature (°C.) | | Chemical resistance | |
| Example | Tenacity (kg/mm$^2$) | Elongation (%) | TD$^a$ | TD$^b$ | o-Chlorophenol | Acetone |
| 10 | 5.5 | 75 | 81 | more than 300 | 90 | Substantially clear even after one hour |
| 11 | 5.6 | 83 | 76 | more than 300 | 86 | Substantially clear even after one hour |
| 12 | 5.4 | 101 | 75 | more than 300 | 84 | Substantially clear even after one hour |
| 13 | 5.4 | 98 | 77 | more than 300 | 88 | Substantially clear even after one hour |
| Comparative Example 4 | 5.3 | 319 | 67 | 108 | 0 | Immediately whitened |

EXAMPLE 14 AND COMPARATIVE EXAMPLE 5

One hundred (100) parts of polyethylene terephthalate having an intrinsic viscosity of 0.65, 2 parts of diallyl glycidyl isocyanurate and 0.5 part of benzil diethyl ketal were mixed in the same way as in Example 10. The mixture was formed into a transparent film having a thickness of about 500μ. The film was biaxially oriented simultaneously to 3.7 times in each of the longitudinal and transverse directions at 80° C. The stretched film was heat-treated at constant length at 235° C. for 30 seconds. The heat-treated film was exposed to ultraviolet irradiation at about 180° C. for 2 minutes by using the same mercury lamp as in Example 10. The resulting film was crosslinked and became insoluble in o-chlorophenol, but had an elongation of as high as 93%.

To examine the thermal stability of the film, its heat shrinkage at 210° C. was measured, and found to be 0.9%. The results are shown in Table 4.

For comparison, the film of Comparative Example 4 was stretched, and heat-treated in the same way as described above, and the properties of the heat-treated film were measured. It was found to have an elongation of 133%, but a shrinkage at 210° C. of as high as 3.8%. The temperature at which the shrinkage of the film became 0.9% was about 170° C., which was 40° C. lower than that in the present invention.

EXAMPLES 15 TO 20

Example 14 was repeated except that each of the compounds shown in columns (A) and (B) of Table 4 were used instead of 2 parts of diallyl glycidyl isocyanurate and 0.5 part of benzil diethyl ketal. The results are shown in Table 4.

Table 4

| Example | (A) | (B) | Elongation (%) | Shrinkage at 210° C. (%) |
|---|---|---|---|---|
| 14 | Diallyl glycidyl isocyanurate (2) | Benzil ethyl ketal (0.5) | 93 | 0.9 |
| 15 | Dicrotyl glycidyl isocyanurate (3) | Benzophenone (1) | 91 | 0.7 |
| 16 | Dicrotyl-2,3-epoxy-2-methylpropyl cyanurate (2) | Hexamethylene bis(benzoyl benzamide) (1) | 102 | 0.8 |
| 17 | Diallyl-2,3-epoxybutyl cyanurate (3) | Benzil bis(2-methoxyethyl) ketal (0.5) | 88 | 0.6 |
| 18 | Tetrallyl-4,5-epoxycyclohexane-1,2-dicarboxamide (3) | Benzil dimethyl ketal (0.7) | 98 | 0.7 |
| 19 | Tetrallyl-2,3-epoxybutane-1,4-dicarboxamide (2) | Benzophenone (1) | 99 | 0.7 |
| 20 | N,N-diallyl-4,5-epoxycyclohexane-1,2-dicarboxamide (3) | Benzil ethylene ketal (1) | 101 | 0.9 |
| Comparative Example 5 | — | — | 133 | 3.8 |

EXAMPLE 21 AND COMPARATIVE EXAMPLE 6

One hundred (100) parts of polyethylene terephthalate having 15 mole% of isophthalic acid copolymerized in it (intrinsic viscosity of 0.71), 10 parts of diallyl glycidyl cyanurate and 2 parts of benzophenone were melt-mixed, and extruded through a circular nozzle having a diameter of 1 mm to form an undrawn filament having a diameter of about 300 μ. The filament was exposed to ultraviolet irradiation from a 100W high-pressure mercury lamp for 1 minute on a hot plate held at 130° C. The resulting filament was quite insoluble in o-chlorophenol, and remained infusible even at 300° C. At room temperature, the filament had a tenacity of 6.4 kg/mm$^2$ and an elongation of 130%, and in air at 260° C., it had a tenacity of 0.5 kg/mm$^2$ and an elongation of 40%.

For comparison, the same polyethylene terephthalate as above was shaped and tested in the same way as above. At room temperature, the filament had a tenacity of 6.8 kg/mm$^2$ and an elongation of 80%, but at 100° C., its tenacity was almost zero.

EXAMPLE 22 AND COMPARATIVE EXAMPLE 7

The transparent unstretched film obtained in Example 14 was successively stretched biaxially at 80° C. to 3.5 times in the longitudinal direction and to 3.9 times in the transverse direction, and then exposed to ultraviolet irradiation through a stretched polyethylene terephthalate film having a thickness of 50μ by the same mercury lamp as used in Example 10 at constant length at 235° C. for 2 minutes. The treated film was insoluble in orthochlorophenol (the insoluble portion 58%), and had a strength of 21 kg/mm$^2$ and an elongation of 88%. When the film was subjected to a heat deterioration test in a Geer's aging tester at 190° C., the film had a strength of 12.1 kg/mm$^2$ and an elongation of 51% after a lapse of 100 hours, thus showning a retention of more than 50% in both properties.

For comparison, polyethylene terephthalate (intrinsic viscosity 0.65) was formed into a film and treated in the same way as above (the treated film had a strength of 22 kg/mm$^2$ and an elongation of 113%). The film was subjected to the same heat deterioration test. After a lapse of 50 hours, the film had a strength of 11.7 kg/mm$^2$ and an elongation of 52%.

EXAMPLE 23

Example 10 was repeated except that the amount of the diallyl glycidyl isocyanurate was changed to 5 parts, and 0.8 part of succinic anhydride was used. The film had a strength of 5.6 kg/mm$^2$, an elongation of 172%, a heat distortion temperature (TD$^a$) of 77° C., a heat distortion temperature (TD$^b$) of 300° C., and a chemical resistance (o-chlorophenol resistance) of 92%.

EXAMPLE 24 AND COMPARATIVE EXAMPLE 8

One hundred (100) parts of polyethylene terephthalate chips (intrinsic viscosity 0.65; Tg 69° C.; Tm 254° C.) were dried at 170° C., and blended with 3 parts of diallyl glycidyl isocyanurate. A T-die was attached to the tip of an 80 mm φ extruder, and the mixture was melt-extruded through the extruder at a rate of 80 kg/hour. The extrudate was cooled on a cooling rotating drum at a rate of 2.5 m/min. to solidify it and form a sheet having a width of 30 cm and a thickness of 1.7 mm. The sheet was stretched to 3.1 times at 86° C., and then to 3.4 times in the transverse direction at 110° C. The stretched film was then heat-set at 235° C. for 15 seconds. A film sample having a width of 30 cm was cut off from the central portion of the resulting film (sample A).

A film was prepared under the same conditions as above except that the diallyl glycidyl isocyanurate was not added, and the longitudinal stretching and the transverse stretching were carried out at 75° C. and 115° C., respectively. The resulting film was designated as sample B.

The samples A and B were tested for their processability (in terms of heat shrinkage at 150° C. and the degree of delamination), and the results are shown in Table 5. The dielectric constant and dielectric loss of the samples A and B were also measured.

Small pieces with a width of 1 cm were cut out from each of the samples A and B. These small pieces were placed in a Geer's aging tester at 190° C., and deteriorated. The strength and elongation lives of these samples were thus determined. The results are shown in Table 5.

Table 5

| Test items | Example 24 (sample A) | Comparative Example 8 (sample B) |
|---|---|---|
| 1 KHz (20° C.) | | |
| Dielectric constant | 2.6 | 2.7 |
| Dielectric loss (×10$^3$) | 3.8 | 5.7 |
| Processability | | |
| Heat shrinkage (at 150° C.) | 0.5% | 0.5% |
| Degree of delamination | 1.6 mm | 2.1 mm |
| 190° C. | | |
| Elongation life | 101 hrs. | 35 hrs. |
| Strength life | >200 hrs. | 48 hrs. |

EXAMPLES 25 TO 30 AND COMPARATIVE EXAMPLE 9

The same polyethylene terephthalate as used in Example 24 (100 parts) was blended with each of the compounds (B) indicated in Table 6 in the amounts indicated. The blend was melt-extruded to form a sheet having a thickness of 2 mm. The sheet was stretched to 3.5 times simultaneously in both the longitudinal and transverse directions at 85° C., and then heat-set under tension at 235° C. to form a film. The characteristics of the film are shown in Table 6.

For comparison, the above procedure was repeated except that the compound (B) was not used.

Table 6

| Example | Compound (B) (parts) | Heat shrinkage at 150° C. (%) | Degree of delamination (mm) | Dielectric constant | Dielectric loss (×10$^3$) | Heat stable life at 190° C. (hours) | |
|---|---|---|---|---|---|---|---|
| | | | | | | Strength | Elongation |
| 25 | N,N-diallyl p-glycidyl-oxy benzamide (3) | 0.5 | 1.4 | 2.4 | 3.7 | >200 | 93 |
| 26 | Dimethallyl glycidyl isocyanurate (3) | 0.5 | 1.4 | 2.4 | 3.8 | >200 | 95 |
| 27 | Allyl diglycidyl isocyanurate (4) | 0.5 | 1.5 | 2.4 | 3.8 | >200 | 96 |
| 28 | Diallyl glycidyl cyanurate (2) | 0.5 | 1.4 | 2.5 | 3.7 | >200 | 101 |

Table 6-continued

| Example | Compound (B) (parts) | Heat shrinkage at 150° C. (%) | Degree of delamination (mm) | Dielectric constant | Dielectric loss ($\times 10^3$) | Heat stable life at 190° C. (hours) Strength | Elongation |
|---|---|---|---|---|---|---|---|
| 29 | Diallyl glycidyl isocyanurate (2) | 0.5 | 1.4 | 2.4 | 3.9 | >200 | 99 |
| 30 | Dicrotyl glycidyl isocyanurate (3) | 0.5 | 1.5 | 2.5 | 3.8 | >200 | 98 |
| Comparative Example 9 | — | 0.5 | 2.2 | 2.7 | 5.6 | 53 | 37 |

What we claim is:

1. A process for preparing a cured linear aromatic polyester composition, which comprises extruding under melting conditions an uncured linear aromatic polyester composition, said uncured polyester composition comprising
   (A) 100 parts by weight of a saturated linear aromatic polyester in which at least 70 mole% of the acid component consists of an aromatic dicarboxylic acid, and
   (B) 0.1 to 50 parts by weight of a reactive compound which is solid at room temperature or is a liquid having a boiling point of at least 200° C. under atmospheric pressure, and which contains in its molecule at least one aliphatic unsaturated group substantially non-reactive with the polyester (A) and the aliphatic unsaturated group of the reactive compound (B) under conditions of melt-blending with the polyester (A) and at least one epoxy group reactive with the polyester (A) under the melt-blending conditions wherein the aliphatic unsaturated group of the reactive compound is a group expressed by the following formula (I)

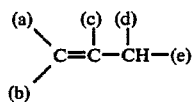
(I)

wherein the bonds (a), (b), (c) and (d) are attached to hydrogen or organic groups and bond (e) is attached to an organic group; and
subjecting the resulting extrudate to a curing treatment.

2. The process of claim 1 wherein the extrudate is in the form of a filament or film.

3. The process of claim 1 or 2 wherein the curing treatment is the application of ultraviolet irradiation in the presence of a photo-reaction initiator.

4. The process of claim 1 wherein the nonreactive aliphatic unsaturated group of the reactive compound (B) is a group expressed by the following formula

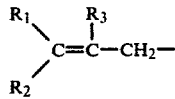
(II)

wherein
R$_1$, R$_2$ and R$_3$ are identical or different, and each represent a group selected from the class consisting of a hydrogen atom and alkyl groups with 1 to 6 carbon atoms, and the epoxy group of the reactive compound (B) is a group expressed by the following formula

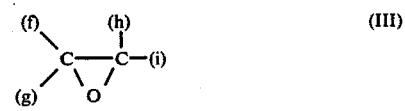
(III)

wherein
bonds (f) to (h) are bonded to hydrogen atoms or alkyl groups with 1 to 6 carbon atoms, and bond (i) or bonds (i) and (g) are organic moieties including general formula (II).

5. The process of claim 1 wherein the reactive compound (B) is a compound of the formula

wherein A represents a group of the formula

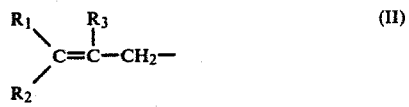
(II)

wherein
R$_1$, R$_2$ and R$_3$ are identical or different, and each represent a group selected from the class consisting of a hydrogen atom and alkyl groups with 1 to 6 carbon atoms;
B represents an epoxy group of the formula

(III)

in which bonds (f) to (h) are bonded to hydrogen atoms or alkyl groups with 1 to 6 carbon atoms, and bond (i) or bonds (i) and (g) are organic moieties including general formula (II), X represents a direct bond,

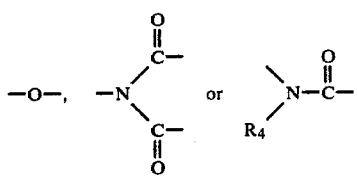

in which R$_4$ represents a hydrogen atom, an alkyl group containing 1 to 6 carbon atoms, or AQ$_1$-; Y represents a direct bond, —O—, or —NH—; Q represents an organic group having a valence of 2 to 4; Q$_1$ and Q$_2$ represent a direct bond or an organic group having a valence of 2 to 4; and n, m, n' and m' are positive integers.

6. The process of claim 5 wherein the reactive compound (B) is a cyanuric or isocyanuric acid derivative corresponding to general formula (IV) in which X and Y represent a direct bond; Q represents

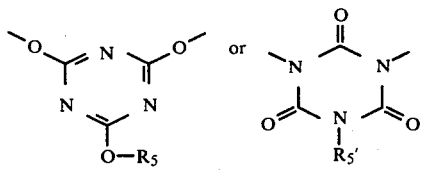

in which $R_5$ and $R_5'$ represent an alkyl group, $AQ_1$-, or $BQ_2$-; $Q_1$ and $Q_2$ represent a direct bond or an alkylene group with 1 to 5 carbon atoms, and each of n, m, n' and m' is 1.

7. The process of claim 5 wherein the reactive compound (B) is an imide or amide compound corresponding to general formula (IV) wherein X is

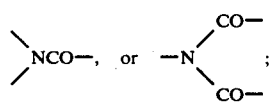

Q represents an aliphatic group having a valence of 2 to 4 and containing 2 to 20 carbon atoms, an alicyclic group having a valence of 2 to 4 and containing 4 to 12 carbon atoms, a group having a valence of 2 to 4 and comprising

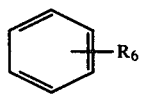

(in which $R_6$ represents a hydrogen atom, an aryl group with 6 to 12 carbon atoms, an alkyl group with 1 to 6 carbon atoms, an alkyloxy group with 1 to 6 carbon atoms, a nitro group or a halogen atom), a group having a valence of 2 to 4 and comprising

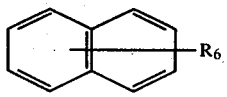

(in which $R_6$ is as defined above), or a group having a valence of 2 to 4 and comprising

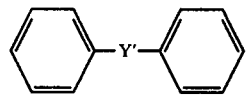

(in which Y' represents a member of the group consisting of —O—, —CO—, —SO$_2$—, —NR$_6'$—, $R_6'$ being a hydrogen atom or an alkyl group with 1 to 6 carbon atoms, —O(CH$_2$CH$_2$)$_l$O—, l being an integer of 1 to 3, and alkylene groups with 2 to 12 carbon atoms); and $Q_1$ and $Q_2$ represent a direct bond or an alkylene group having 1 to 5 carbon atoms.

8. The process of claim 1 wherein the linear aromatic polyester (A) has an intrinsic viscosity, as measured in o-chlorophenol at 35° C., of at least 0.4.

9. The process of claim 1 in which the aliphatic unsaturated group of the reactive compound (B) is an allyl, methallyl or crotyl group.

10. The process of claim 1 wherein the epoxy group of the reactive compound (B) is a glycidyl, 2,3-epoxy-2-methylpropyl, or 2,3-epoxy butyl group.

11. The process of claim 9 wherein the epoxy group of the reactive compound (B) is a glycidyl, 2,3-epoxy-2-methylpropyl, or 2,3-epoxy butyl group.

12. The process of claim 4 in which the nonreactive aliphatic unsaturated group of formula (II) is an allyl group and the epoxy group of formula (III) is a glycidyl group.

* * * * *